United States Patent [19]
White

[11] Patent Number: 5,719,382
[45] Date of Patent: Feb. 17, 1998

[54] DISPLAY PERIPHERAL INCORPORATING A WEDGE INTERFACE

[75] Inventor: Daniel F. White, Lawrenceville, Ga.

[73] Assignee: NCR Corporation, Dayton, Ohio

[21] Appl. No.: 681,035

[22] Filed: Jul. 22, 1996

[51] Int. Cl.[6] .................................................. G06F 17/60
[52] U.S. Cl. .......................... 235/375; 235/449; 235/462; 395/216; 395/217
[58] Field of Search .............................. 235/375, 449, 235/462; 395/216, 217, 223

[56] References Cited

U.S. PATENT DOCUMENTS

| | | | |
|---|---|---|---|
| 4,047,159 | 9/1977 | Boudry | 364/900 |
| 4,882,475 | 11/1989 | Miller et al. | 235/383 |
| 5,179,375 | 1/1993 | Dick et al. | 340/825.51 |
| 5,233,658 | 8/1993 | Bianco et al. | 235/449 |
| 5,256,863 | 10/1993 | Ferguson et al. | 235/383 |
| 5,258,604 | 11/1993 | Behrens et al. | 235/462 |
| 5,488,676 | 1/1996 | Harding, Jr. | 235/449 |

Primary Examiner—F. L. Evans
Attorney, Agent, or Firm—James P. Davidson

[57] ABSTRACT

An electronic cash register system is disclosed as including a personal computer, a display peripheral directly connected to the personal computer which has a wedge interface incorporated therein, a keyboard connected to a first input of the wedge interface so that keyboard data is transmitted to the personal computer via the connection between the display peripheral and the personal computer, and at least one external peripheral device connected to separate inputs of the wedge interface so that data therefrom is wedged into the keyboard data and transmitted to the personal computer via the connection between the display peripheral and the personal computer.

19 Claims, 2 Drawing Sheets

DISPLAY PERIPHERAL INCORPORATING A WEDGE INTERFACE

BACKGROUND OF THE INVENTION

1. Field of the Invention

The present invention relates generally to wedge interfaces which enable peripheral devices to communicate with a personal computer and, in particular, to a display peripheral of an electronic cash register system having a wedge interface incorporated therein which enables data input into the wedge interface from other peripheral devices to be wedged into a keyboard data stream input and transmitted to a personal computer of the electronic cash register system via the connection between the display peripheral and the personal computer.

2. Description of Related Art

Electronic cash registers are conventionally employed to register and process sales information, as well as enable more rapid and effective treatment of sales data. As shown and described in U.S. Pat. No. 5,179,375 to Dick et al., a conventional electronic cash register is generally comprised of a terminal, which in its simplest form may be a repackaged personal computer. The cash register further includes a keyboard for entering sales or other pertinent data and a display for displaying any desired information that has been processed by the terminal.

It is frequently desired to enable input of data to the terminal from other sources, such as a bar code reader, a magnetic stripe reader, a laser gun, an optical character reader, or other external peripheral devices. This has typically been accomplished by connecting separate components comprising the electronic cash register via proprietary interfaces. However, such interfaces are not conducive to an open systems environment, where application software migration and compatibility are critical components in addition to peripheral connectivity and cable routing.

Peripheral devices have also been known to input data to the terminal through a wedge device, with the keyboard and external peripheral devices being connected to the terminal via the wedge device instead of directly to the terminal. In this arrangement, the wedge device combines the outputs from the keyboard and from the external peripheral devices and sends the composite output signal to the electronic cash register terminal. Currently, the wedge devices have been positioned within the keyboard or as a separate external device. As further seen in the Dick et al. reference, separate cables are provided to connect the keyboard to the wedge device and the wedge device to the terminal. In addition, another separate connection is required between the terminal and the display. These cable connections, as well as those necessary to connect any external peripheral devices to the wedge device, consequently present an environment which complicates cable routing of the overall system.

In light of the foregoing, a primary objective of the present invention is to provide an electronic cash register system having an architecture which permits external peripheral devices to be connected to a personal computer thereof via a minimum number of cables.

Another object of the present invention is to provide an electronic cash register system having an architecture which reduces the number of physical connections to an external peripheral device utilized with the personal computer thereof.

A further object of the present invention is to provide an electronic cash register system having an architecture which permits external peripheral devices to be connected to the personal computer thereof without altering current keyboard microcontroller firmware.

Yet another object of the present invention is to provide an electronic cash register system having an architecture which increases the flexibility of implementing a multitude of external peripheral devices with the personal computer thereof.

Still another object of the present invention is to provide an electronic cash register system having an architecture which permits the connection of external peripheral devices to the personal computer thereof by means of standard interfaces.

Another object of the present invention is to provide an electronic cash register system having an architecture which powers any external peripheral devices connected thereto through the personal computer thereof without any external power supply.

A still further object of the present invention is to provide an electronic cash register system including a wedge device located in the display thereof to make such display the main connection point for any external peripheral devices.

Yet another object of the present invention is to provide a method of interfacing an external peripheral device with a personal computer of an electronic cash register system which simplifies the cable routing between components of such system.

These objects and other features of the present invention will become more readily apparent upon reference to the following description when taken in conjunction with following drawing.

SUMMARY OF THE INVENTION

In accordance with one aspect of the present invention, an electronic cash register system is disclosed as including a personal computer, a display peripheral directly connected to the personal computer which has a wedge interface incorporated therein, a keyboard connected to an input of the wedge interface so that keyboard data is transmitted to the personal computer via the connection between the display peripheral and the personal computer, and at least one external peripheral device connected to separate inputs of the wedge interface so that data therefrom is wedged into the keyboard data and transmitted to the personal computer via the connection between the display peripheral and the personal computer.

In accordance with a second aspect of the present invention, a display peripheral for an electronic cash register system is disclosed which has a direct connection with a personal computer in the system. A wedge interface is incorporated within the display peripheral for receiving data from a keyboard and at least one external peripheral device. The external peripheral device data is wedged into the keyboard data by the wedge interface to form a composite data stream which is then transmitted to the personal computer via the connection between the display peripheral and the personal computer.

In accordance with a third aspect of the present invention, a method of interfacing at least one external peripheral device with a personal computer of an electronic cash register system is disclosed. The method includes the steps of incorporating a wedge interface within the display peripheral, connecting a keyboard to an input of the wedge interface so that keyboard data is transmitted thereto, connecting at least one external peripheral device to an input of the wedge interface so that data is transmitted thereto, wedging the external peripheral device data into the keyboard data to form a composite data stream, and transmitting the composite data stream from the wedge interface to the personal computer via the connection between the display peripheral and the personal computer. The method also includes the step of distinguishing the keyboard data from the external peripheral device data in the composite data stream upon receipt by the personal computer.

In accordance with a fourth aspect of the present invention, a peripheral device having a direct connection to a personal computer via a standard interface is disclosed. The peripheral device includes a wedge interface incorporated therein which receives data from a keyboard and at least one external peripheral device, wherein the external peripheral device data is wedged into the keyboard data to form a composite data stream transmitted to the personal computer via the connection between the peripheral device and the personal computer.

BRIEF DESCRIPTION OF THE DRAWING

While the specification concludes with claims particularly pointing out and distinctly claiming the present invention, it is believed the same will be better understood from the following description taken in conjunction with the accompanying drawing in which:

DETAILED DESCRIPTION OF THE INVENTION

Figure 1:
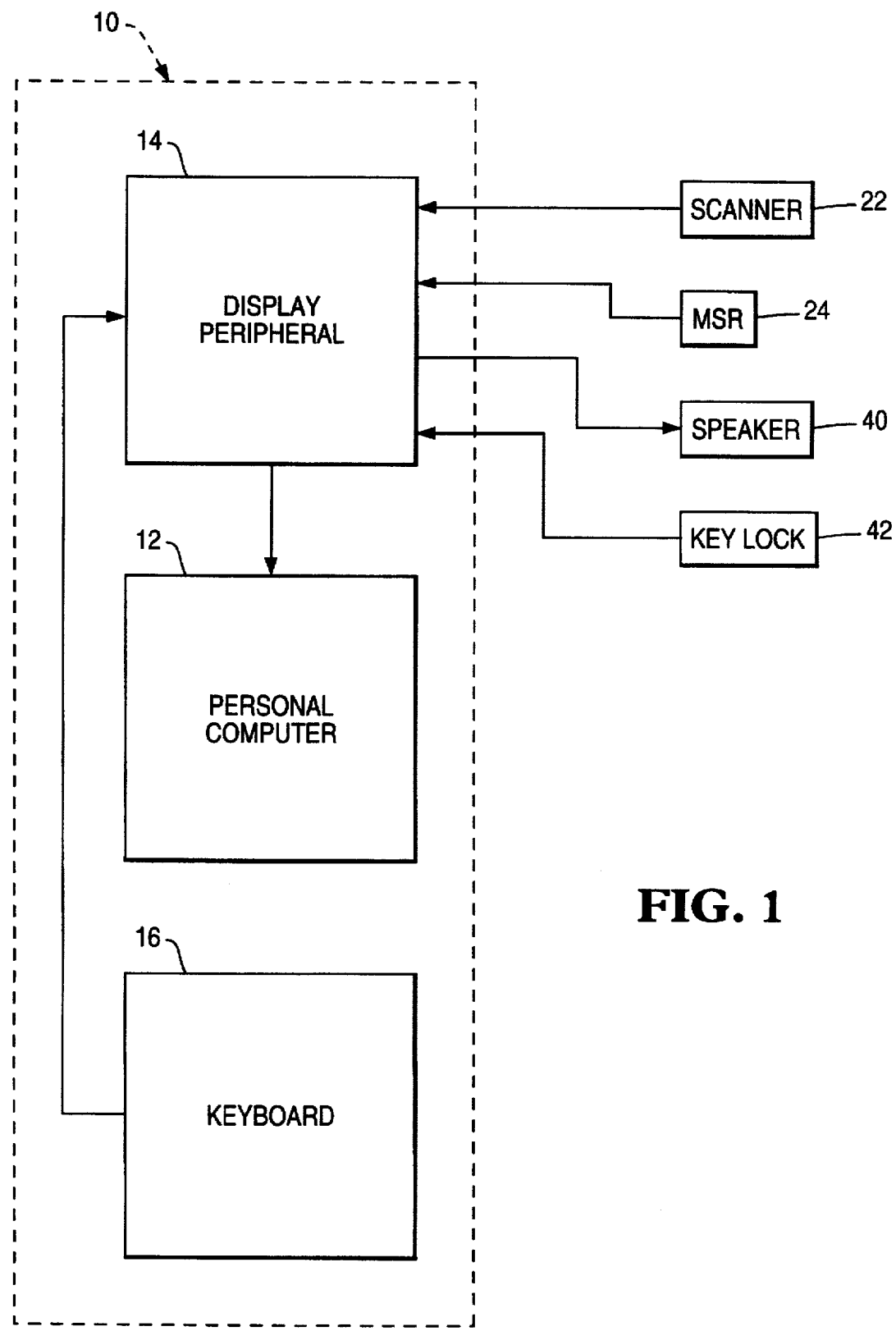
FIG. 1 is a schematic diagram of an electronic cash register system in accordance with the present invention.
Figure 2:
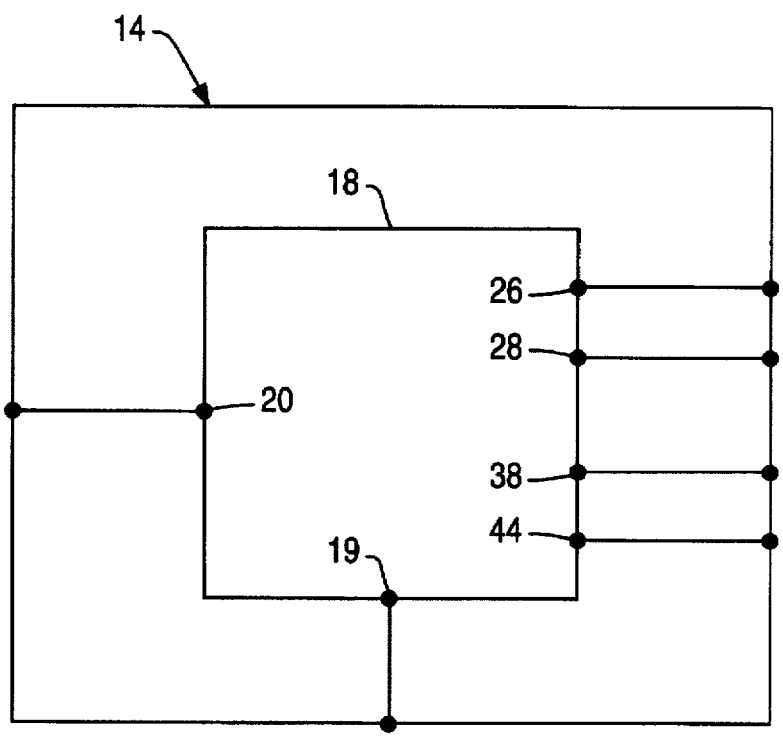
FIG. 2 is a schematic diagram of the display peripheral depicted in FIG. 1.

Referring now to the drawing in detail, wherein identical numerals indicate the same elements throughout the figures, FIG. 1 depicts an electronic cash register system in accordance with the present invention generally designated by the numeral 10. Electronic cash register system 10 includes a terminal, typically in the form of a repackaged personal computer 12, and a display peripheral 14 directly connected thereto by means of a cable 15 having a standard interface at each end (e.g., a pair of 50 pin connectors in which one is coupled to the main printed circuit board of display peripheral 14 and the other is connected to personal computer 12) for displaying any desired information that has been processed by personal computer 12. Exemplary display peripherals which may be utilized in electronic cash register system 10 of the present invention include the NCR 5952 Wedge Dynakey and NCR 5962 Wedge Touch Screen manufactured by NCR Corp. of Dayton, Ohio. Electronic cash register system 10 further has a keyboard 16 associated therewith for entering sales or other pertinent data into personal computer 12.

It will be seen in FIG. 1 that keyboard 16 is connected to display peripheral 14 instead of directly to personal computer 12. More specifically, keyboard 16 is connected to an input 20 of a wedge interface 18 incorporated in display peripheral 14. Wedge interface 18, which may consist of either an ASIC, multiple microcontrollers, or discrete logic, is electrically connected to the main printed circuit board (not shown) of display peripheral 14. The main printed circuit board is then connected, in turn, to cable 15 via the 50 pin connector so that a clock line, a data line, and at least one ground connection for wedge interface 18 is allocated for the connection between cable 15 and display peripheral 14. In this way, keyboard data input into wedge interface 18 is transmitted through the clock and data lines thereof, shown generally as an output 19, to personal computer 12 via cable 15 without altering the microcontroller firmware in keyboard 16. In addition, one or more external peripheral devices, as indicated by the numerals 22 and 24, are preferably connected to respective inputs 26 and 28 of wedge interface 18 so as to be connected in series with keyboard 16. In order to transmit data from such external peripheral devices 22 and 24 to personal computer 12, wedge interface 18 amplifies and formats such data and then wedges it into the keyboard data to form a composite data stream which is provided to output 19 for transmission. Preferably, the composite data stream provided by wedge interface 18 will include special start and end characters to indicate that the information is from one or more of the external peripheral devices instead of keyboard 16. It will be understood that exemplary external peripheral devices include, but are not limited to, scanners, magnetic stripe readers, laser guns, bar code readers, optical character readers, and the like.

Figure 3:
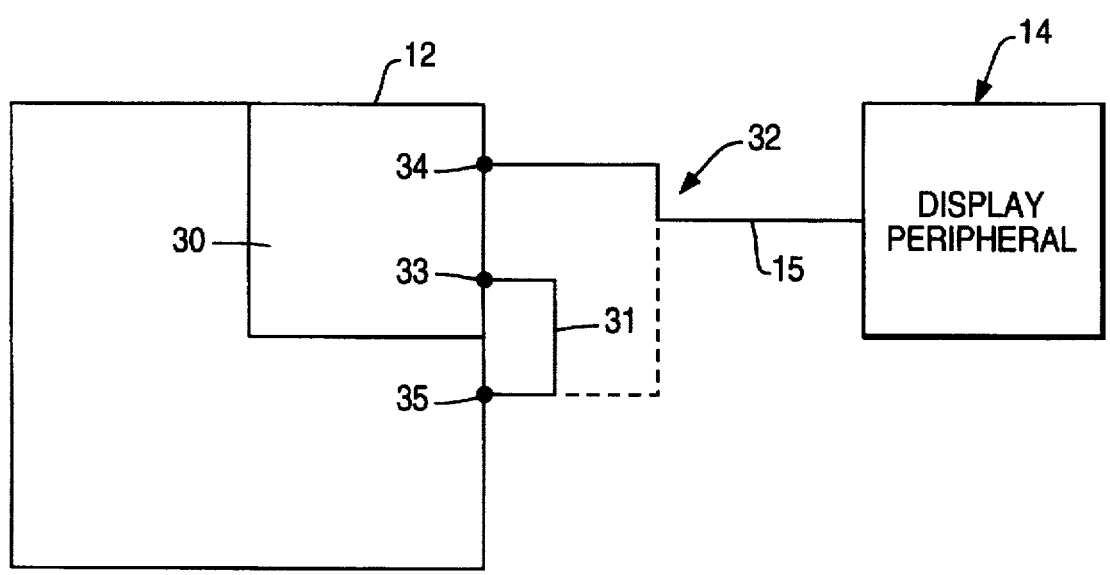
FIG. 3 is an enlarged schematic diagram of the connection between the display peripheral and the personal computer depicted in FIG. 1.

With respect to the data comprising the composite data stream transmitted to personal computer 12, it may be segregated or interpreted by personal computer 12 in any number of ways. Nevertheless, it is contemplated that personal computer 12 will include a display adapter portion 30 which is connected to display peripheral 14 by cable 15 (and the respective 50 pin connector at that end). Display adapter portion 30 will preferably include circuitry which interprets the composite data stream as keyboard input, but filters the keyboard data from the composite data stream and sends such keyboard data to an appropriate port or electronic card (see cable 31 in FIG. 3 connected at one end to an exit port 33 of display adapter portion 30 and at a second end to an input port 35 of personal computer 12). Alternatively, display peripheral 14 may be connected to personal computer 12 via a Y connection 32 (see dashed lines in FIG. 3) in which the composite data stream is split so that the external peripheral device data enters a first port 34 and the keyboard data directly enters input port 35 on personal computer 12. This arrangement provides a clean architecture which can be powered directly from personal computer 12 without any external power supply (thereby saving further cable management problems).

It will further be seen that wedge interface 18 may be utilized as a main connection point for other peripheral devices. For example, an output port 38 on wedge interface 18 can be provided for connecting to a speaker 40. In this way, certain information may be indicated audibly by electronic cash register system 10. Another way of utilizing the capacity of wedge interface 18 is to provide data relating to a key lock 42 of electronic cash register system 10 to an input 44. Key lock 42 will generally involve several levels, such as locked, retail, supervisor, and exception, whereby operation of electronic cash register system 10 is prevented, permitted with certain limitations, or otherwise permitted with expanded functionality. In any event, key lock 42 is able to prevent the unauthorized use of electronic cash register system 10.

It will be understood that by utilizing display peripheral 14, and particularly wedge interface 18 therein, as the main connection point for as many external peripheral devices as possible, the number of physical connections to personal computer 12 are minimized. By limiting the number of cables used by electronic cash register system 10, a corresponding increase in system reliability is obtained. This consideration is very important in the retail market, as limited connections to a personal computer and cable management are continuing problems. Moreover, the architecture of electronic cash register 10 described herein permits the leveraging of emerging point-of-sale (POS) keyboard standards to maintain open software interfaces, which in turn enables migration and compatibility of application software.

Having shown and described the preferred embodiment of the present invention, further adaptations of the above-described electronic cash register system and the display peripheral thereof can be accomplished by appropriate modifications by one of ordinary skill in the art without departing from the scope of the invention, including the claimed methods.

What is claimed is:

1. An electronic cash register system, comprising:
   (a) a personal computer;
   (b) a display peripheral directly connected to said personal computer, said display peripheral including a wedge interface incorporated therein;
   (c) a keyboard connected to a first input of said wedge interface, wherein keyboard data is transmitted to said personal computer via the connection between said display peripheral and said personal computer; and
   (d) at least one external peripheral device connected to separate inputs of said wedge interface, wherein data from said external peripheral device is wedged into said keyboard data and transmitted to said personal computer via the connection between said display peripheral and said personal computer.

2. The electronic cash register system of claim 1, wherein said external peripheral device is a scanner.

3. The electronic cash register system of claim 1, wherein said external peripheral device is a magnetic stripe reader.

4. The electronic cash register system of claim 1, said system further comprising a speaker connected to an output of said wedge interface.

5. The electronic cash register system of claim 1, said system further comprising a key lock connected to an input of said wedge interface to prevent unauthorized use of said system.

6. The electronic cash register system of claim 1, said personal computer further comprising a display adapter portion for separating said keyboard data from said external peripheral device data.

7. The electronic cash register system of claim 1, wherein said display peripheral is connected to said personal computer so that said keyboard data is provided to a first port and said external peripheral device data is provided to a second port.

8. In a display peripheral for an electronic cash register system, wherein said display peripheral has a direct connection with a personal computer in said system, the improvement comprising a wedge interface incorporated within said display peripheral for receiving data from a keyboard and at least one external peripheral device, wherein said external peripheral device data is wedged into said keyboard data to form a composite data stream which is transmitted to said personal computer via the connection between said display peripheral and said personal computer.

9. The electronic cash register system of claim 8, wherein the number of physical connections to said personal computer are minimized.

10. The electronic cash register system of claim 8, wherein said external peripheral device is a scanner.

11. The electronic cash register system of claim 8, wherein said external peripheral device is a magnetic stripe reader.

12. The electronic cash register system of claim 8, said wedge interface further comprising an input port for a key lock to prevent unauthorized use of said system.

13. The electronic cash register system of claim 8, said wedge interface further comprising an output port for a speaker.

14. The electronic cash register system of claim 8, wherein said external peripheral devices are indirectly connected to said personal computer via said connection between said display peripheral and said personal computer.

15. A method of interfacing at least one external peripheral device with a personal computer of an electronic cash register system, said system also including a display peripheral directly connected to said personal computer, comprising the steps of:
   (a) incorporating a wedge interface within said display peripheral;
   (b) connecting a keyboard to an input of said wedge interface so that keyboard data is transmitted thereto;
   (c) connecting at least one external peripheral device to separate inputs of said wedge interface so that data is transmitted thereto;
   (d) wedging said external peripheral device data into said keyboard data to form a composite data stream; and
   (e) transmitting said composite data stream from said wedge interface to said personal computer via the connection between said display peripheral and said personal computer.

16. The method of claim 15, further comprising the step of connecting a speaker to an output of said wedge interface so that data shown on said display peripheral is also audible.

17. The method of claim 15, further comprising the step of connecting a key lock to said wedge interface to prevent unauthorized use of said system.

18. The method of claim 15, further comprising the step of distinguishing said keyboard data from said external peripheral device data in said composite data stream upon receipt by said personal computer.

19. A peripheral device having a direct connection to a personal computer via a standard interface, said peripheral device including a wedge interface being incorporated therein which receives data from a keyboard and at least one external peripheral device, wherein said external peripheral device data is wedged into said keyboard data to form a composite data stream transmitted to said personal computer via the connection between said peripheral device and said personal computer.

* * * * *